United States Patent [19]
Lupke

[11] Patent Number: 5,744,091
[45] Date of Patent: Apr. 28, 1998

[54] APPARATUS FOR MAKING ANNULARLY RIBBED PLASTIC PIPE AND METHOD OF MAKING SUCH PIPE

[76] Inventor: Manfred A. A. Lupke, 92 Elgin Street, Thornhill, Ontario, Canada, L3T 1W6

[21] Appl. No.: 666,385

[22] PCT Filed: Dec. 20, 1993

[86] PCT No.: PCT/CA93/00552

§ 371 Date: Jun. 19, 1996

§ 102(e) Date: Jun. 19, 1996

[87] PCT Pub. No.: WO95/17295

PCT Pub. Date: Jun. 29, 1995

[51] Int. Cl.$^6$ ................................................. B29C 49/04
[52] U.S. Cl. ................................ 264/508; 264/166; 264/515; 264/540; 425/532; 425/336; 425/393; 425/396
[58] Field of Search ........................................ 264/508, 166, 264/506–507, 515, 539, 540, 542; 425/532, 336, 393, 396, 115

[56] References Cited

U.S. PATENT DOCUMENTS

| | | | |
|---|---|---|---|
| 2,978,745 | 4/1961 | Langecker | 264/542 |
| 3,304,357 | 2/1967 | Langecker | 264/542 |
| 3,819,788 | 6/1974 | Grumbach | 264/167 |
| 3,844,700 | 10/1974 | Sokolow | 425/532 |
| 4,204,826 | 5/1980 | Mehnert | 264/542 |
| 4,361,530 | 11/1982 | Peer | 425/325 |
| 4,365,948 | 12/1982 | Chaplain . | |
| 4,473,525 | 9/1984 | Drori | 264/508 |
| 4,674,969 | 6/1987 | Korn | 425/325 |
| 4,787,598 | 11/1988 | Rahn et al. . | |
| 5,017,321 | 5/1991 | Comfort | 264/508 |
| 5,330,342 | 7/1994 | Linss et al. | 264/539 |
| 5,510,071 | 4/1996 | Van Wonderen et al. | 264/508 |
| 5,516,482 | 5/1996 | Lupke | 264/508 |

FOREIGN PATENT DOCUMENTS

| | | |
|---|---|---|
| 2077872 | 3/1994 | Canada . |
| 270694 | 11/1986 | European Pat. Off. . |
| 1918336 | 11/1969 | Germany . |
| 9311140.1 | 10/1993 | Germany . |

*Primary Examiner*—Jeffery R. Thurlow

[57] ABSTRACT

An apparatus for forming a thermoplastic pipe having a profiled surface includes a nozzle having an extrusion orifice feeding extrudate in a downstream direction to a mold path which extends from the nozzle and along which are provided a first mold block and a second mold block downstream of the first mold block. The mold blocks are closable around the extrudate to form the pipe and are openable to release the pipe. The mold blocks are moved together with one another and with the pipe in the downstream direction when the mold blocks are closed and are opened and sequentially moved in an upstream direction along an axis contiguous with the axis of the mold path while the extrudate continues to move in the downstream direction. The first mold block is moved in the upstream direction before the second mold block such that the mold blocks never pass one another on the mold path. After the mold blocks are moved in the upstream direction, they are then reclosed around the extrudate at a position to maintain consistency of the profile of the pipe.

8 Claims, 4 Drawing Sheets

APPARATUS FOR MAKING ANNULARLY RIBBED PLASTIC PIPE AND METHOD OF MAKING SUCH PIPE

This invention relates to apparatus and a method for making annularly or helically ribbed plastic pipe and method of making such pipe.

Semi-rigid thermoplastic, annularly profiled pipe such as corrugated or ribbed pipe or substantially smooth walled pipe, has traditionally been made in a travelling mold tunnel. Conventional travelling mold tunnels comprise two endless tracks of hot mold blocks which come together along a forward run of the tunnel to provide a cylindrical mold travelling in the direction of extrusion. Such travelling mold tunnels with two endless tracks of half mold blocks are complex pieces of machinery requiring precise synchronization of the tracks. Moreover, they require a very great deal of space to accommodate the return runs of the tracks. This use of space becomes excessive when large diameter pipe is being molded. To best utilize the space available some conventional travelling mold tunnels have been made with one run above the other rather than in side by side relationship.

Various attempts have been made to provide travelling mold tunnels of other types. Thus, for example, Manfred A. A. Lupke in U.S. patent application Ser. No. 854,988 directed to hinged mold blocks, provides an apparatus in which mold blocks are hinged together and follow a return path in the same plane as the operating run without the need to change the orientation of the mold blocks during their return.

Another example of an early type of travelling mold tunnel which does not involve a return run along a different path is disclosed in Canadian Patent No. 962,412 issued Feb. 11, 1975 to Industriele Orderneming Wavin N.V. In that Canadian patent there is disclosed a mold tunnel which comprises only two pieces. Each piece is a longitudinal half of the whole tunnel. In operation the two piece mold is closed and moves forwardly at extrusion speed. At intervals it opens and moves rearwardly so that they never advance so far forward as to leave the molding region. That type of arrangement involved accurate precise movement of heavy long mold halves. It was necessary that he halves have appreciable length to support the pipe molded therein during cooling and setting.

A later mold tunnel of a somewhat similar type is disclosed in U.S. Pat. Nos. 4,911,633 and 5,017,321 issued Mar. 27, 1990 and May 21, 1991 respectively to Gordon A. Comfort. These patents disclose a method and apparatus for using a small number of mold blocks, e.g. two or three mold blocks in a mold tunnel. Each mold block is divided into two longitudinal halves. As one mold block, with its halves closed in molding configuration, advances the other (or others) leapfrog over it on a second parallel path to take up an upstream position. Such an arrangement allows for smaller, higher, more maneuverable mold blocks than those of Wavin, but it does not provide for return of the blocks without displacing them from the production track.

The present inventor has addressed the problem of still further space consideration. He has also addressed the problem of opening the mold blocks without the need for hinging in a system where mold block return is without change of orientation of mold blocks themselves. He has still further addressed the problems that exist in returning the mold blocks along the same path as that of their advance.

He has, therefore, attempted to provide a system in which the return path of the mold blocks is not laterally displaced from the operating paths.

According to the invention there is provided apparatus and a method for molding profiled, thermoplastic pipe. The apparatus comprises A travelling mold tunnel for the molding of pipe therein in an operating run, the mold tunnel comprising at last two mold blocks each having a tubular mold surface in a closed condition and being openable into an open condition to release pipe molded therein, in which individual mold blocks of the mold tunnel are returnable in steps at regular intervals along a return path whose longitudinal axis is contiguous with the longitudinal axis of the operating run. The mold blocks thus move in a back and forth linear manner, never passing one another. Thus while there is an overall constant movement forward in the extrusion direction, individual mold blocks pulsatingly backstep to maintain a position within a specific distance with respect to an extrudate delivery point into the tunnel. Usually the tubular mold tunnel is cylindrical but other tubular forms are contemplated.

More particularly, the invention comprises apparatus for forming profiled thermoplastic pipe comprising; at least two mold blocks, each block being closeable into a closed condition to form a tubular mold surface and openable from said closed condition, each block being moveable along the track in forward and rearward directions along an axis of the cylindrical mold surface; an elongate extrusion nozzle having an annular extrusion orifice projecting into an upstream, end of the travelling mold tunnel along the axis of the cylindrical mold surface for the extrusion of extrudate into an upstream one of the mold blocks thereinto; means to move the mold blocks together in forward travel along the axis of the cylindrical mold surface at a forward speed commensurate with mold of pipe in the mold tunnel; means to pulse individual mold blocks in rearward travel against the direction of the forward travel, the mold blocks being in their closed condition during forward travel and in their open condition during rearward travel; and means to initiate said rearward travel sequentially for each mold block such that an upstream mold block starts rearward travel before a next adjacent downstream mold block.

The upstream mold block (herein called the first mold block), i. the mold block which receives hot extrudate from the extrusion nozzle, should have an axial length greater than the distance of return travel. However, the distance of return travel may be quite short.

Thus, the upstream mold block performing the primary molding of extrudate from the extrusion nozzle may be correspondingly short. The annular extrusion orifice may be a single annular orifice or may comprise coaxial orifices for the production of double-walled pipe.

It is believed a potential advantage that the upstream mold block be as short and light and maneuverable as possible, for example that the backward pulse of the mold block may only be sufficient to relocate a molding profile e.g. an annular crest, from one corresponding trough of extrudate into the next adjacent upstream trough. Of course, the backward step or pulse may jump several profiles. Whether the backstep or pulse covers only one profile or several, it is necessary that the backstepped mold blocks re-close over formed extrudate at a point where the mold profile of the block and that of the formed extrudate match. Thus, it is thought desirable that the regular intervals of the backsteps should be frequent, and the distance of travel of the backsteps should be short.

Indeed, it is important that the point at which extrudate issues out of the extrusion nozzle into the travelling mold tunnel is always within a closed part of the tunnel. Thus the length of a mold block must be greater than that of the predetermined distance through which it travels in a forward and reverse direction. When the mold block into which the extrusion nozzle projects is at its extreme upstream position, i.e. at the beginning of its forward travel, the orifice of the extrusion nozzle may be in a downstream region of the mold block. As the mold block travels forwardly over the extrusion nozzle orifice, it will move such that the extrusion nozzle orifice becomes located in an upstream region of the mold block. Before the mold block travels so far forwardly that the extrusion nozzle is exited from the mold block, the reverse movement must take place.

The next downstream mold block (herein called the second mold block) from the upstream mold block may be of the same length as the upstream mold block or different. While all mold blocks may carry services, such as cooling means for the pipe, this next downstream mold block may be longer than the upstream mold block and may be especially useful for carrying means for cooling the extrudate. Cooling in any or all the mold blocks may be by water cooling or, in some cases, air cooling.

In another mold of operation two shorter mold blocks may together comprise a composite mold block and move together.

If more than two mold blocks are used, e.g. three mold blocks, then the further downstream mold blocks may again be shorter than the second mold block. It is an advantage to provide a mandrel support within the pipe being formed. When the first mold block opens to release the soft formed extrudate, it will move backwards only a short distance and may close again before the extrudate has had an opportunity to deform. Nevertheless, support within the formed extrudate at this point may be of appreciable advantage. The second and further downstream mold blocks may have the effect of finishing or refinishing any anomalies in the pipe due to momentary release of the mold. Such anomalies may, in any case, be no worse than marks on the pipe produced between adjacent mold blocks of a conventional travelling mold tunnel.

It will, of course, be appreciated that the back and forth pulsation sufficient to allow for continuous forward production speed of the extrudate without allowing it to sag out of shape. Normal extrusion speeds (and thus the speed of the mold tunnel) may be in the range of 1 to 2 meters per minute for large diameter pipe.

Any number of mold blocks may be used in the mold block train. As in any travelling mold tunnel, the upstream mold block in the operating run are most active in the preliminary molding process and the furthest downstream of the mold blocks playing a more important part in supporting molded pipe while it cools. It may be that two mold blocks are sufficient in the present apparatus, the first, upstream mold block surrounding the orifice of the extrusion nozzle and reciprocating with a slow forward stroke and a fast return stroke to play the most active molding part. The second mold block of this pair will act to support pipe especially during the return stroke of the first mold block. further downstream mold blocks will provide further backup.

It is probable, however that a preferred number of mold blocks may be three.

Of course, a number of blocks greater than three may be used but it is thought that additional apparatus parts and equipment may not provide much significant advantage over the use of three blocks.

Conveniently each mold block is carried on carrier blocks. The carrier mold blocks may be moveable forwardly and rearwardly on a longitudinal track and each mold block may comprise a pair of diametric mold block halves reciprocally slidable on the respective carrier block transverse to the direction of movement of the carrier block to open or close the mold block. Each carrier block may have a groove and tongue connection with the base of the mold block which it carries, i.e. the bases of both mold block halves making up said mold block. Each carrier block may be wider than its associated mold block so that the mold block halves may slide on their groove and tongue connections with the carrier blocks to close to form the closed tubular mold block and to open when they slide apart.

Although the invention is generally described with reference to apparatus including carrier blocks, it will be appreciated that other means for carrying and aligning the mold blocks are possible, for example guide carrier rods may be used in place of the carrier blocks and any track therefor.

Opening and closing of the mold blocks may be mechanically achieved through hydraulic mechanism initiated through a sensor switch when the mold block reaches either a predetermined position for opening or closing respectively. Alternatively, opening or close may be through a cam mechanism or any other mechanism within the skill of a man skilled in the art. Return mechanism for moving each mold block on its return stroke may be any convenient mechanism such as a cam mechanism or hydraulic mechanism dependent on the means chosen to drive the mold blocks. In effect the mold blocks are disengaged from a continuous forward drive and engaged with drive for the back step. The mold block halves may slide fully apart or may open in a hinged manner or in any other convenient manner.

The positioning of the mold block at the beginning of the forward stroke is of importance. If ribbed or corrugated pipe is being formed it is important that the mold block is positioned exactly so as to provide continuity in the pipe. Thus, when positioning the mold block at the beginning of the forward stroke, at last the most recently or upstream corrugation of already molded pipe should mate with the appropriate downstream molding surface of the mold block. Such precise positioning of the mold blocks in relation to the pipe may be carried out by any convenient means.

BRIEF DESCRIPTION OF THE DRAWINGS

An embodiment of the invention will now be described by way of example with reference to the drawings in which.

DETAILED DESCRIPTION ACCORDING TO THE PREFERRED EMBODIMENTS OF THE PRESENT INVENTION

Figure 1:
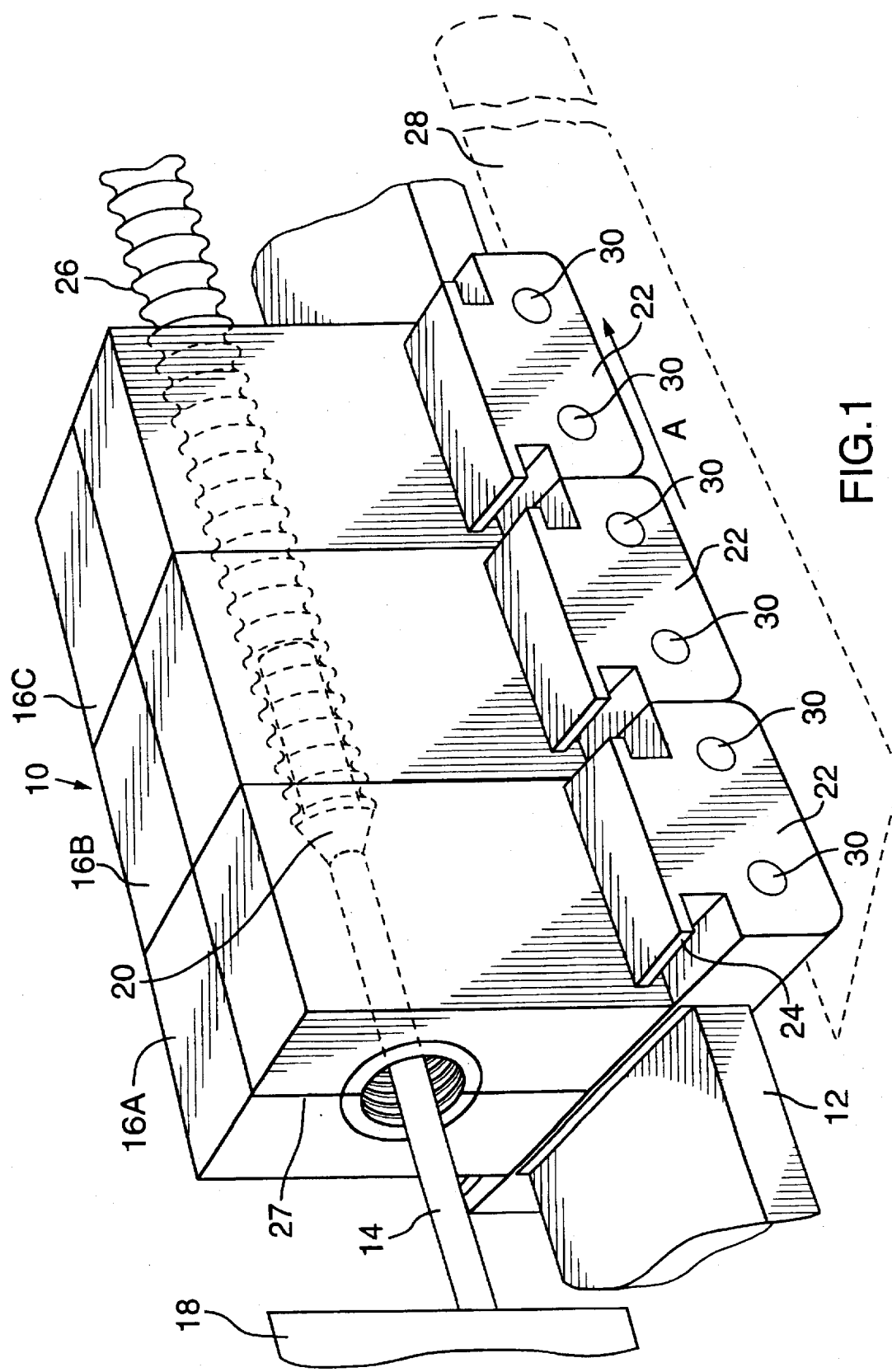
FIG. 1 is a perspective view of one mold tunnel according to the present invention.
Figure 2:
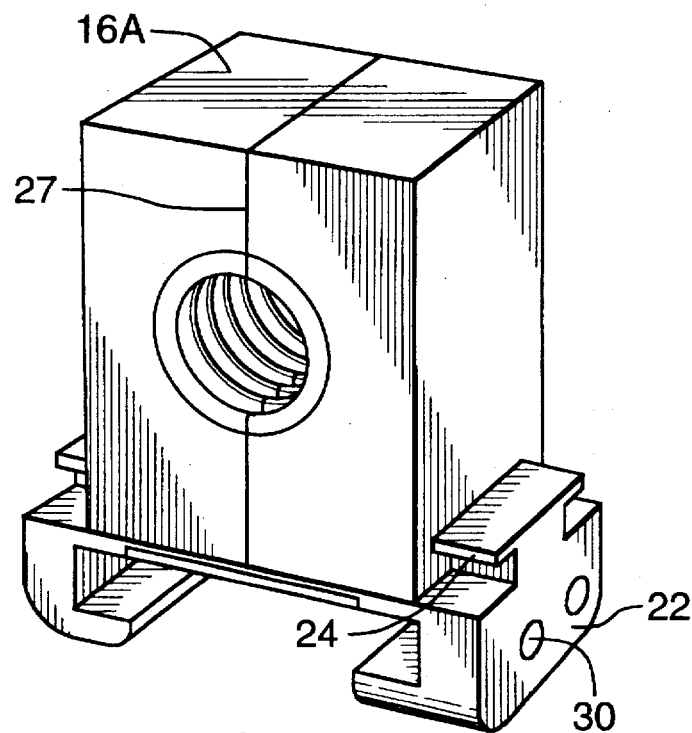
FIG. 2 is a view of one closed mold block of the mold tunnel of FIG. 2.
Figure 3:
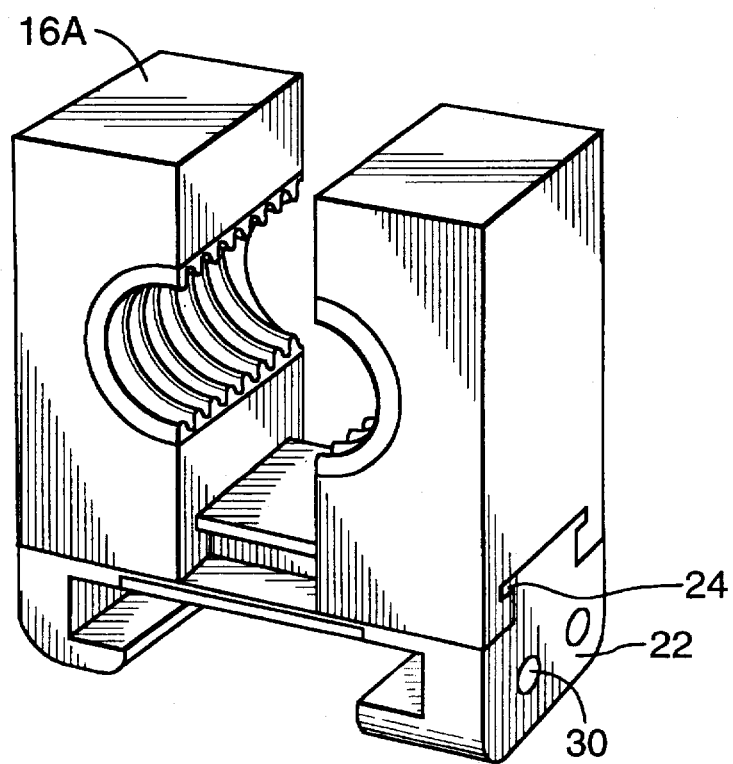
FIG. 3 is a view of the mold block of FIG. 3 open.

FIG. 1 illustrates mold tunnel 10 moving in a track 12 in the direction of arrow A. An extrusion nozzle 14 extends into the mold blocks 16A, 16B and 16C of the extrusion tunnel 10 from extruder 18 which is shown only roughly. The extrusion nozzle 14 has a delivery end 20 for extrudate located within the mold tunnel 10 to mold pipe 26 therein.

Each of the mold blocks 16A, 16B and 16C is made up of two mold block halves which are slidable towards each other and away from each other on carrier blocks 22 which are movable in either direction on guide track 12. Each carrier block has a ridge or tongue 24 on its upper surface extending laterally at 90° to the axis of the track 12. This tongue 24 co-operates slideably with a groove in the bottom of each of the mold block halves of mold blocks 16A, 16B and 16C so that the mold block halves may slide together and apart.

When the mold block halves slide apart they disengage from pipe 26. When the mold block halves are slid together they mate one with the other to form a tubular mold block at a mating diametric plane 27. Suction may be applied, if desired, at the mold surface of each mold block 16A, 16B, 16C to enhance molding. Such suction may be applied by conventional techniques which will not be described here.

Any convenient mechanism may be provided for causing the carrier blocks 22 and their associated mold blocks 16A, 16B and 16C to move in the direction of arrow A (See FIG. 1 and FIGS. 4A–4G). For example, an endless chain, the path 28 of which is indicated in FIG. 1 in broken lines, engaging drive lugs 30 of the carrier blocks may be provided or a toothed ratchet mechanism may be provided. This is largely a matter of choice and no especially preferred means has been illustrated. A one way ratchet mechanism may, however be desirable so as to provide for easy return of the carrier blocks on the return stroke. Whatever the drive means chosen, it should be possible to transport the carrier blocks 22 and their associated mold blocks 16A, 16B and 16C in the direction of arrow a at a speed conforming with the speed of extrusion, i.e. the production speed of extrudate from the extrusion orifice 20 of the extrusion nozzle 14.

In the embodiment shown three mold blocks 16A, 16B and 16C are used. This is not intended to be limited and the use of more mold blocks is possible and the use of only two mold blocks is also possible. Further features of the apparatus will become apparent from the following description of the operating cycle in forming annularly profiled thermoplastic pipe, for example annularly ribbed or corrugated plastic pipe. The production of helically profiled pipe is also possible and, in this specification and claims, the term "annularly" is intended to include helical.

Figure 4A:
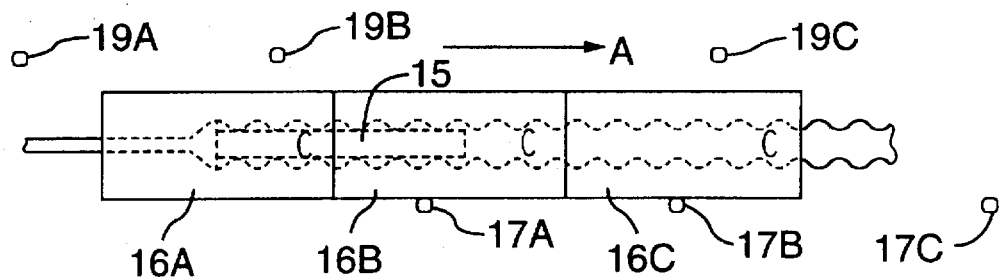
FIGS. 4A to 4G indicate positions of the mold blocks of a mold tunnel such as that of FIG. 1 during different parts of the cycle in molding pipe.

In operation, the carrier blocks are moved forward in the direction of arrow A at a constant speed dictated by the speed of extrusion through extrusion nozzle 14. At the beginning of the forward movement the delivery orifice of extrusion nozzle 14 is located as shown in FIG. 4A and the mold blocks 16A, 16B and 16C are generally in the positions shown in FIG. 4A. In all of FIGS. 4A to 4G the mold blocks 16 are variously labelled "C" or "O". A "C" designation indicates that the mold blocks are closed for molding tube and an "O" designation indicates that the mold block is open for its return stroke.

Figure 4B:
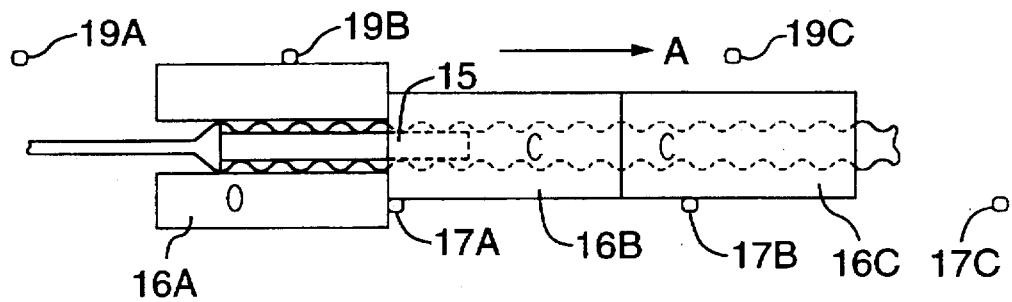

As the mold blocks 16A, 16B and 16C advance into the position shown in FIG. 4B, the delivery end 20 of extrusion nozzle 14 becomes located to the upstream end of the upstream mold block 16A (the first mold block). At this point of travel, mold block 16A trips a microswitch 17A and is opened to release the pipe which has just been molded within it. This pipe 26 is still in softened condition and is supported in closed second and third mold blocks 16B and 16C. Preferably a support mandrel 15 is provided extending from the extrusion nozzle orifice 20 at least for a short distance. Suitably, this short distance may be similar or nearly similar to the distance 26A, 26B and 26C backstepped by the mold blocks 16A, 16B, 16C in a manner described below. Mold block 16A is disengaged from the forward carriage and backstepped into the position shown in FIG. 4C. This backstep movement takes place so that mold block 16A has closed again in the position shown in FIG. 4D before the softened pipe in the unsupported section indicated as 26A has had time to sag or lose its molded shape. Closing may be initiated by microswitch 19A. The size of the backstep 26A has been shown in a series of FIG. 4 drawings as being appreciable. The sizes of the backstep shown in the drawings is for ease of illustration. In fact, it is grossly exaggerated so that the steady forward progression may be indicated clearly. The distance by which each of the mold blocks is backstepped may be small in comparison with the width of the corrugation or rib on pipe being molded. Thus a very small portion of pipe is unsupported or only supported by mandrel support 15 at any one time.

Figure 4C:
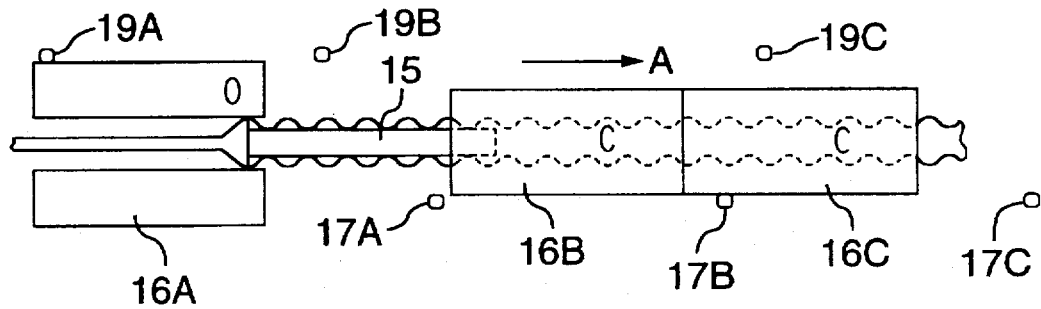
Figure 4D:
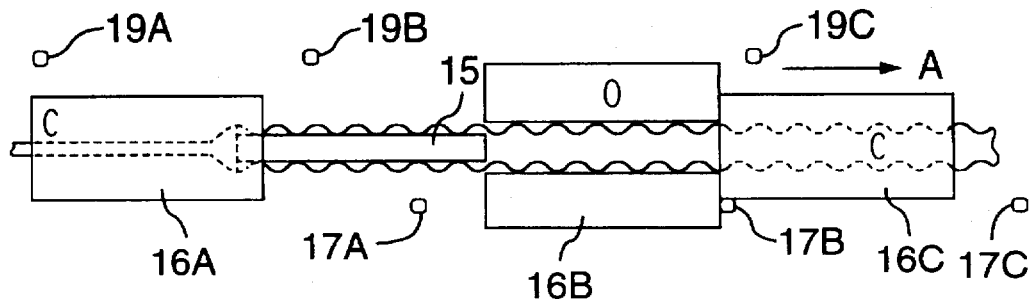
Figure 4E:
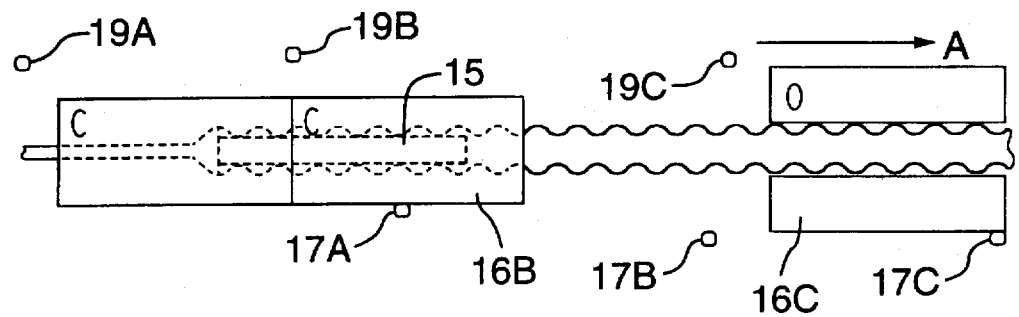

When the mold block 16A has reached the position shown in FIG. 4C and has then been closed into the position shown in FIG. 4D, the next mold block 16B is backstepped by a similar distance to support tube issuing from mold block 16A. Movement of mold blocks 16B and 16C is initiated by microswitches 17B, 17C and 19B, 19C in a similar manner to that described for mold block 16A. Thus as mold block 16A closes into the position shown in FIG. 4D, mold block 16B opens and is disengaged from the forward carriage and is backstepped rapidly into the position shown in FIG. 4E.

It is sufficient for the purpose of the invention that only mold blocks 16A and 16B be used so that the extrudate is supported at two points at all times. Thus, if only mold blocks 16A and 16B Are used the extrudate will be supported by the extrusion nozzle and by mold block 16B when mold block 16A is open and backstepping.

Figure 4F:
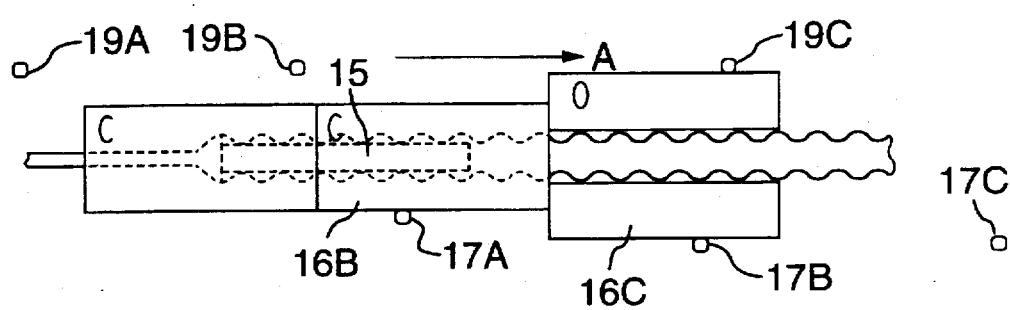
Figure 4G:
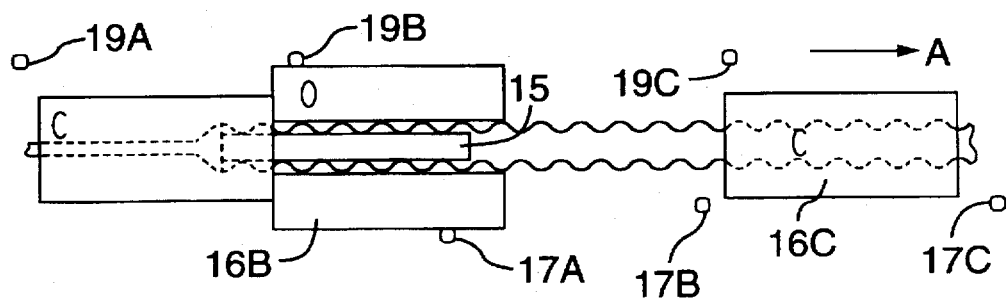

Although only two mold blocks may be used, it is probable that three mold blocks will be desirable for considerations of both support and minimum number of moving parts. Therefore, FIGS. 4F and 4G illustrate the further movement of mold block 16C in a similar manner to that described for mold block 16B, (or indeed for mold block 16A). It will be appreciated that more than three mold blocks may be used if desired.

Consideration as to the distance of backspace 26A is not only important because tube must not sag or deform during this movement, but respective mold blocks must re-engage molded tube so that their mold surfaces conform with already formed ribs or corrugations in the tube. Thus when mold block 16B backsteps, it will close over tube which has already been molded. If it is not to deform such molding it must close on the pipe with considerable precision so that it grooves and crests mate exactly with the corresponding crests and grooves of the pipe. Indeed, this consideration is probably of prime importance since mold block 16B may re-mold any defects in the pipe which may have occurred due to unduly soft extrudate. Similar comments may be made in respect to mold block 16C when it backsteps over section 26B of pipe. However, section 26B will have had the opportunity to cool and harden better than section 26A.

Figure 5:
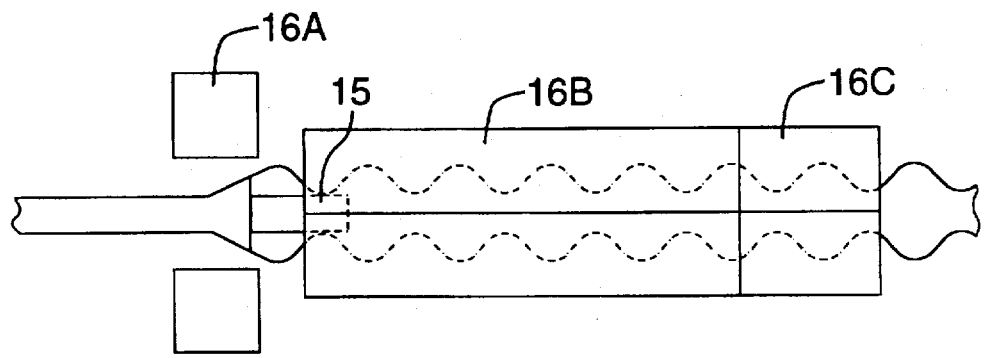
FIG. 5 shows another sketch of the mold tunnel with mold blocks of different length.

Although the mold blocks 16A, 16B and 16C are shown in FIGS. 4A–4G as being of similar length, in practice it is likely that first mold block 16A will be appreciably shorter than second mold block 16B. FIG. 5 shows a rough sketch of slightly more realistic comparative dimensions of the arrangement. Second mold block 16B usefully may carry services such as cooling fluid e.g. water or possibly air.

The embodiments of the invention in which an exclusive property or privilege is claimed are defined as follows:

1. Apparatus for forming thermoplastic pipe having a profiled surface, said apparatus comprising a nozzle having an extrusion orifice feeding extrudate in a downstream direction to a mold path having a longitudinal axis extending from said nozzle, first and second mold blocks on said mold path which are closable to form the pipe and which are openable to release the pipe, the first mold block being in an upstream position relative to the second mold block, the mold blocks being moved together with one another and with the pipe in the downstream direction when the mold blocks are closed, and the mold blocks being opened and sequentially moved in an upstream direction along an axis contiguous with the axis of the mold path while the extrudate continues to move in the downstream direction with the first mold block being moved in the upstream direction before the second mold block such that the mold blocks never pass one another on the mold path and the mold blocks then being reclosed around the extrudate at a position to maintain consistency of the profile of the pipe.

2. Apparatus as claimed in claim 1, wherein said extrusion orifice is located within said first mold block during both the downstream and the upstream movement of said first mold block.

3. Apparatus as claimed in claim 1, wherein said first mold block is short relative to said second mold block.

4. Apparatus as claimed in claim 1, including a third mold block on said mold path downstream of said second mold block, said first and second mold blocks always remaining upstream of said third mold block.

5. Apparatus as claimed in claim 1, including a support mandrel along the mold path onto which the extrudate is fed from said nozzle.

6. Apparatus as claimed in claim 5, wherein said support mandrel has a length at least as long as the distance that said first mold block is moved in the upstream direction.

7. Apparatus as claimed in claim 1, including first and second mold block carriers which move in the upstream and the downstream direction and on which said first and second mold blocks are respectively mounted, each mold block comprising a pair of diametric mold block halves which open and close relative to one another by sliding on their respective mold block carrier in a direction transverse to the upstream and downstream movement of the mold block carrier.

8. A method of forming thermoplastic pipe having a profiled surface, said method comprising feeding an extrudate in a downstream direction from an extruder nozzle to a mold path having a longitudinal axis extending from the nozzle with first and second mold blocks being located on the mold path, the mold blocks being closable around the extrudate to form the pipe and being openable to release the pipe, the first mold block being in an upstream position relative to the second mold block, moving the mold blocks together with one another and with the extrudate in the downstream direction when the mold blocks are closed, opening and sequentially moving the mold blocks in an upstream direction along an axis contiguous with the axis of the mold path while the extrudate continues to move in the downstream direction, the first mold block being moved in the upstream direction before the second mold block such that the mold blocks never pass one another on the mold path, and then reclosing the mold blocks around the extrudate at a position to maintain consistency of the profiled surface of the pipe.

\* \* \* \* \*